Figure 2A:
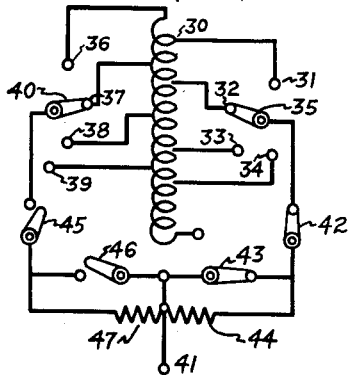

March 28, 1961 W. M. JOHNSON 2,977,527
SWITCHING ARRANGEMENT
Filed March 12, 1957 3 Sheets-Sheet 1

Inventor,
Wallace M. Johnson,
by Gilbert P. Tarleton
His Attorney.

March 28, 1961  W. M. JOHNSON  2,977,527
SWITCHING ARRANGEMENT
Filed March 12, 1957  3 Sheets-Sheet 2

Inventor,
Wallace M. Johnson,
by Gilbert P. Tarleton
His Attorney.

March 28, 1961  W. M. JOHNSON  2,977,527
SWITCHING ARRANGEMENT
Filed March 12, 1957  3 Sheets-Sheet 3
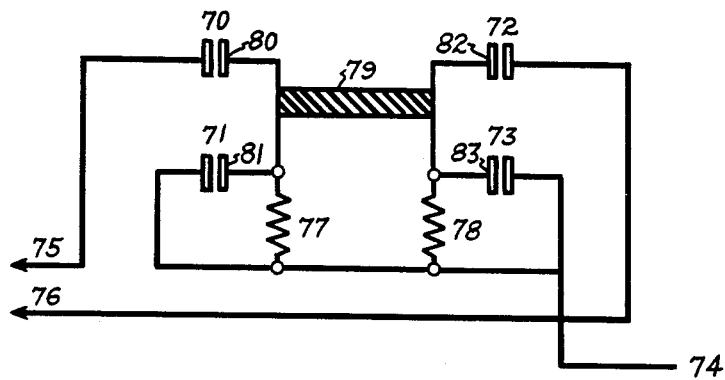
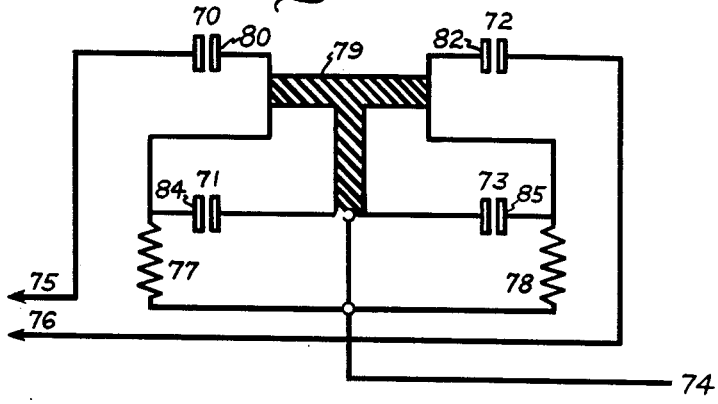
Inventor,
Wallace M. Johnson,
by Gilbert P. Tarleton
His Attorney.

United States Patent Office 2,977,527
Patented Mar. 28, 1961

2,977,527
SWITCHING ARRANGEMENT

Wallace M. Johnson, Pittsfield, Mass., assignor to General Electric Company, a corporation of New York Filed Mar. 12, 1957, Ser. No. 645,442
1 Claim. (Cl. 323—43.5)

This invention relates to high voltage electrical apparatus, and more in particular to an improved switching arrangement for load tap changing apparatus of the type generally employing resistors as transition impedances.

In the use of high voltage electrical equipment such as power transformers, it is frequently desirable to provide means for changing taps on the apparatus, such as for regulation of voltage, without disconnecting the apparatus from service. While a number of arrangements have been employed in the past to successfully accomplish the tap changing under load operations, the present invention is directed to the type of tap changing equipment in which a pair of tap fingers are arranged to sequentially contact alternate taps on the electrical apparatus, and a number of rapidly moving contactors are arranged to switch a power circuit from one tap finger to the other tap finger. In order to prevent short circuiting two adjacent taps or opening the power circuit during the tap change, transition impedances are connected serially with the tap fingers during the switching. In this particular type of arrangement, the transition impedances are generally resistors, and for the sake of economy the resistors are designed only for carrying the load currents of the power circuit during the short transition period between the time that the power circuit is connected to one tap and the time that the power circuit is connected to the next adjacent tap.

In the conventional switching arrangement, which will be described in more detail in reference to the drawings, it has been found that satisfactory switch operation is not assured in the event that system short circuits occur simultaneously with a tap changing operation. The inability of the contactors of the conventional arrangement to interrupt an abnormal arc results in the possibility of a direct short circuit across adjacent taps of the apparatus.

It is therefore an object of this invention to provide an improved tap switching arrangement for load tap changing apparatus.

It is also an object to provide a load tap changing arrangement minimizing the possibility of direct short circuits across a winding tap arising from inability of the arrangement to successfully interrupt the current under abnormally large current conditions.

It is a further object of this invention to provide an improved tap changing under load arrangement of the type employing a pair of sequentially operated tap fingers contacting adjacent taps of a winding, and having contactors arranged to switch a power circuit between the tap fingers, the invention providing a switching arrangement arranged to minimize the possibility of direct short circuits between taps on the winding arising from inability of the contactors to successfully interrupt abnormal currents.

Briefly stated, in accordance with one aspect of my invention, I provide a load tap changing means for sequentially connecting an electric circuit, such as a power circuit, to a plurality of taps on an electrical apparatus such as a power transformer. The tap changing means comprises a pair of contact fingers arranged to sequentially contact the taps on the apparatus, and means for alternately connecting the power circuit to the contact fingers. The means for connecting the electric circuit to the contact fingers comprises a pair of contacts serially connected between each of the fingers and the electric circuit. A transition impedance, such as a resistor, is connected in parallel with each of the contacts connected to the electric circuit. Means are provided for operating the contacts to rapidly disconnect the electric circuit from one of the contact fingers and connect it to the other of the contact fingers.

While the specification concludes with claims particularly pointing out and distinctly claiming the subject matter which I regard as my invention, it is believed that the invention will be better understood from the following description taken in connection with the accompanying drawing.

Figure 1A:
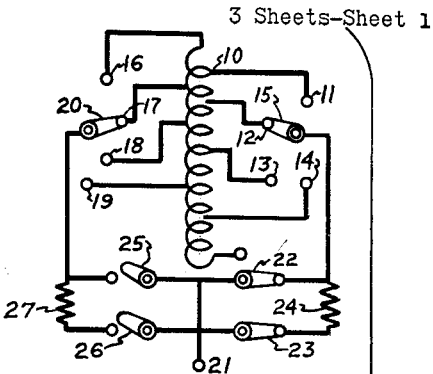
Figure 2B:
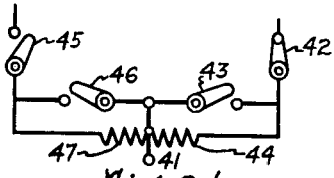
Figure 1B:
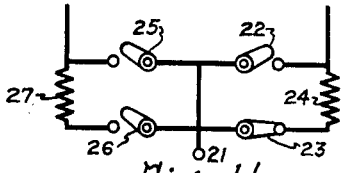
Figure 2C:
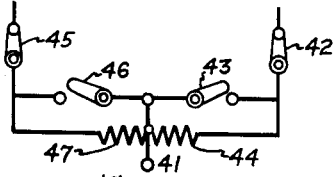
Figure 1C:
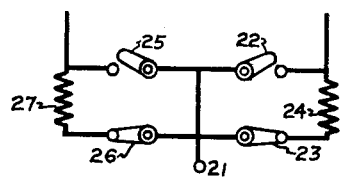
Figure 2D:
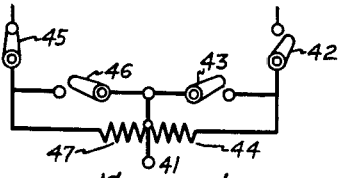
Figure 1D:
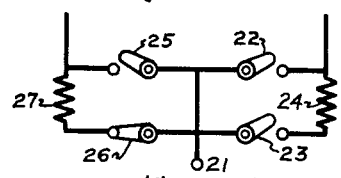
Figure 2E:
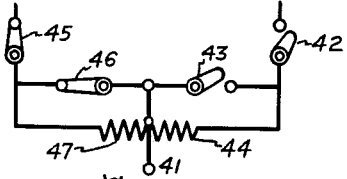
Figure 3A:
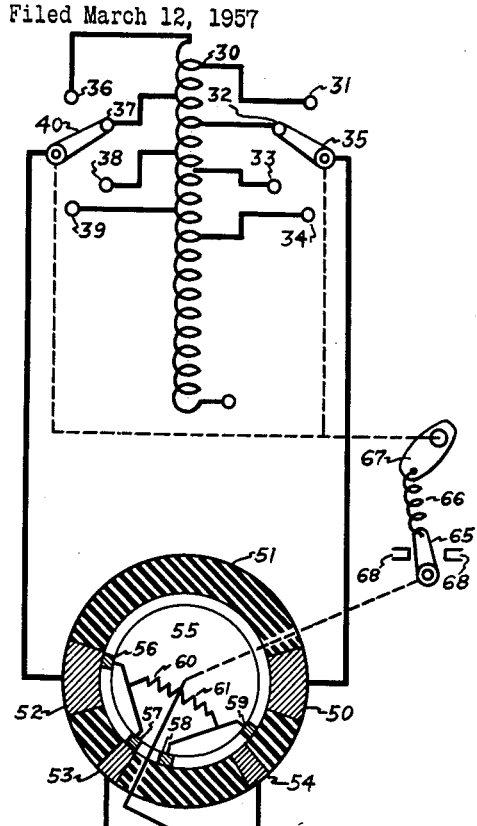

In the drawings:

Fig. 1a is a simplified circuit diagram of a conventional prior art load tap changing arrangement, illustrating the tap fingers and contactors in an operating tap position, Figs. 1b through 1e illustrate the sequential positions of the contactors of Fig. 1 in changing from the tap position of Fig. 1a to the next adjacent tap position, Fig. 2a is a simplified circuit diagram of a load tap changing arrangement according to my invention, the tap fingers and contactors being illustrated as they would appear on one tap position, Figs. 2b through 2e illustrate the contactors of Fig. 2a in the sequential positions they would assume during a tap changing operation, Fig. 3a is a cross-sectional view of a rotary contactor connected to a tapped winding according to my invention, the position of the contactor of Fig. 3a illustrating an operating tap position, Figs. 3b through 3e illustrate the various positions the contactor of Fig. 3a assumes during a tap changing operation, Fig. 4 is a circuit diagram of a modified arrangement of the contactors of Fig. 2, and Fig. 5 is a circuit diagram of another modification of the arrangement of Fig. 2.

Referring now to the drawings, and more in particular to Fig. 1, therein is illustrated a winding 10 having a plurality of taps. Sequentially disposed taps 11, 12, 13 and 14 are arranged to contact a tap finger 15, and taps 16, 17, 18 and 19 are arranged to contact a tap finger 20. The taps 11–14 are alternated on the winding with the taps 16–19, and the tap fingers 15 and 20 are mechanically arranged as is well known in the art so that they sequentially contact adjacent taps on the winding 10.

The tap finger 15 is connected to a power circuit 21 by way of a contactor 22. Another contactor 23 serially connected with a transition impedance 24, such as a resistance, is connected in parallel with the contactor 22. Similarly, the tap finger 20 is connected to the power circuit 21 by way of a contactor 25, and series connected contactor 26 and transition impedance 27 are connected in parallel with the contactor 25.

Figure 1E:
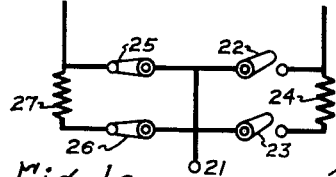

In an operating tap position, such as illustrated in Fig. 1a, both the contactors connected to one tap finger are closed and both the contactors connected to the other tap finger are open. Thus, in Fig. 1a, contactors 22 and 23 are closed while contactors 25 and 26 are open, and the power circuit 21 is directly connected to the tap 12 on the winding. In order to connect the power circuit 21 to the next adjacent tap on the winding, the contactor 22 directly connecting the power circuit 21 to tap finger 15 is opened as shown in Fig. 1b. At this time, all of the system current flows to the power circuit by way of contactor 23 and transition impedance 24. Then, as illustrated in Fig. 1c, the contactor 26 is closed so that the power circuit 21 is connected to tap 12 by way of transition impedance 24 and to tap 17 by way of transition impedance 27. Next, as illustrated in Fig. 1d, the contactor 23 is opened to remove all connection between the power circuit and the tap 12. At this time, the power circuit 21 is still connected to tap 17 by way of the transition impedance 27. In the final step, as illustrated in Fig. 1e, the contactor 25 is closed, thereby providing a direct connection between the power circuit 21 and the next adjacent tap 17.

In the arrangement of Fig. 1, it is to be noted that if the contactor 22 had failed to open in the tap changing operation, a direct connection would be provided between the adjacent taps 12 and 17. While this condition may not normally occur, it has been found that frequently the contactors are not capable of interrupting short circuit currents. Thus, if abnormally large current flows in the winding at the same time that a tap changing operation is taking place there is a danger that failure of the contactors to interrupt the current will result in a direct short circuit between adjacent taps on the winding, with the consequent damage to the apparatus.

Referring now to Fig. 2a, the present invention provides an arrangement having a winding 30 with taps 31, 32, 33 and 34 connected to a tap finger 35, and taps 36, 37, 38 and 39 connected to a tap finger 40. The taps 31–34 are disposed alternately with the taps 36–39 on the winding 30. In the arrangement of Fig. 2a, a power circuit 41 is connected to tap finger 35 by way of serially connected contactors 42 and 43. The contactor 42 is connected directly to the tap finger 35, and a transition impedance 44, which may be a resistor, is connected in parallel with the contactor 43. Similarly, the power circuit 41 is connected to the tap finger 40 by way of serially connected contactors 45 and 46, the contactor 45 being directly connected to the tap finger 40. A transition impedance 47 is connected in parallel with the contactor 46.

In an operating tap position, as illustrated in Fig. 2a, the two contactors connecting the power circuit to one tap finger are closed, while the contactors connecting the power circuit to the other tap finger are both open. Thus, initially, contactors 42 and 43 are closed connecting power circuit 41 to tap finger 35 directly, and the contactors 45 and 46 are open. In order to connect the power circuit to the next adjacent tap on the winding, the contactor 43 in parallel with the resistor 44 is first opened as illustrated in Fig. 2b, thereby inserting the transition impedance 44 in series between the power circuit and the tap finger 35. In the next step (Fig. 2c), the contactor 45 is closed, so that the power circuit is connected to the tap finger 35 by way of transition impedance 44 and to the tap finger 40 by way of transition impedance 47. Next, as in Fig. 2d, the contactor 42 is opened, removing all connection between the power circuit and tap finger 35. In the final step, as illustrated in Fig. 2e, the contactor 46 is closed to establish a connection between the power circuit 41 and the next adjacent tap 37.

In the arrangement of Fig. 2, if the contactor 43 fails to interrupt the arc, the probability that the arc will be interrupted before direct connection of the power circuit to the other tap finger 40 is greatly increased because the contactor 42 opens before contactor 46 closes. The reduced danger of a short circuit between adjacent taps of the winding arises from the fact that two serially connected contactors are more effective in interrupting an arc than a single contactor as provided by the arrangement of Fig. 1.

Referring now to Fig. 3a, therein is illustrated one form of my invention employing the circuit of Fig. 2a, with the contactors being of the rotary type. In this arrangement, the tap finger 35 is connected to one conducting segment 50 disposed on a barrel-shaped insulating member 51.

The tap finger 40 is connected to another conducting segment 52 on the barrel-shaped member 51. Two other conducting segments 53 and 54 are disposed intermediate of the segments 50 and 52, and are connected together to the power circuit 41. A rotating insulating member 55 disposed within the barrel-shaped member 51 carries a plurality of contacts 56, 57, 58 and 59 arranged to contact the segments on the barrel-shaped member 51. The contacts 56 and 57 are connected together to transition impedance 60 which is connected to the power circuit 41. Similarly, the contacts 58 and 59 are connected together to transition impedance 61 which is connected to power circuit 41.

The rotatable insulating member 55 carrying the contacts 56–59 is provided with a rapid reversible rotary motion synchronized with the movement of the tap fingers 35 and 40, the mechanical coupling here involved being of any conventional type employed in the art. For example, the rapid motion of the insulating member 55 may be provided by a link 65 arranged to impart a rotary motion to the member 55, the rotary motion of the link 65 being provided by a spring 66 connected between the link 65 and another link 67 arranged to rotate in synchronism with the motion of the tap fingers. Suitable stops 68 may be provided to prevent overtravel of the contacts.

In an operating tap position, as illustrated in Fig. 3a, the contact 56 contacts the segment 52, and the contact 57 contacts the segment 53. This establishes direct contact between the power circuit 41 and the tap finger 40. No contact is established by the contacts 58 and 59.

Figure 3B:
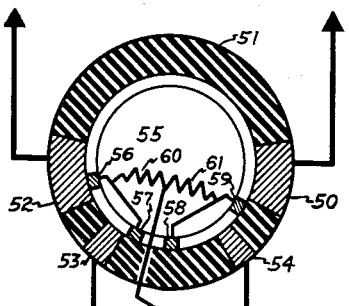
Figure 3C:
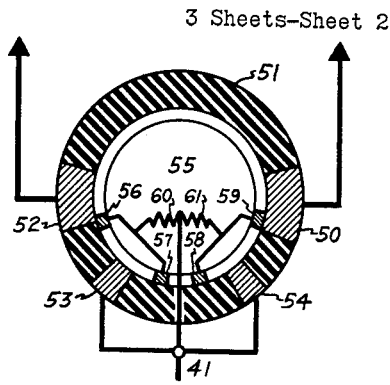
Figure 3D:
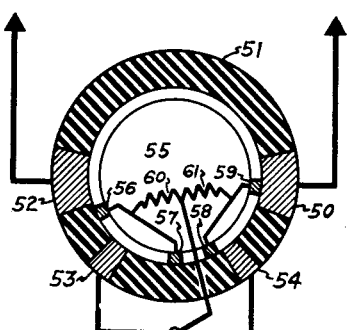
Figure 3E:
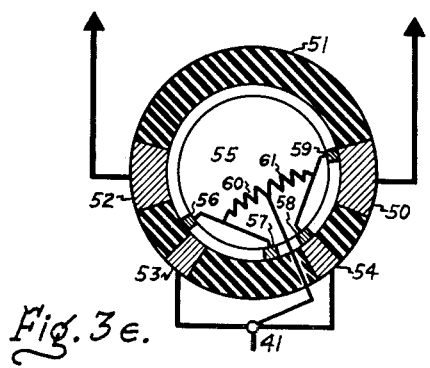

In a tap changing operation, the insulating member 55 is rapidly rotated from the position of Fig. 3a to the position of Fig. 3e. The sequence of contacting that occurs during this tap changing operation is illustrated in Figs. 3b–3e. Upon initiation of the tap changing operation, the contact 57 is first moved out of contacting relationship with the segment 53. This places the transition impedance 60 in series between the power circuit 41 and the tap finger 40 (Fig. 3b). Next, contact is established between the contact 59 and the contact segment 50 (Fig. 3c). At this time, the power circuit 41 is connected to tap finger 40 by way of transition impedance 60, and tap finger 35 is connected to the power circuit 41 by way of transition impedance 61. Next, as in Fig. 3d, the contact 56 moves out of contacting relationship with the segment 52, thereby removing all connection between the power circuit and the tap finger 40. Finally, as illustrated in Fig. 3e, the contact 58 moves into contacting relationship with the conducting segment 54, thereby establishing direct connection between the power circuit 41 and the tap finger 35. In the next tap changing operation, the preceding sequence would be reversed to once again establish connection between the power circuit and the tap finger 40. This would be true whether the tap finger 40 was connected to tap 37, as in Fig. 3a, and also if the tap finger 40 had been moved to its next tap 38.

The switching arrangement of my invention may also employ a switch of the type disclosed in U.S. Letters Patent 1,931,869, which issued on October 24, 1933, to B. Jansen. As illustrated in Fig. 4, the switch comprises four contactors 70, 71, 72 and 73. The contactors are connected between a power circuit 74 and the winding as in the circuit of Fig. 2a, with a lead 75 from one contactor 70 being connected to one tap finger, and lead 76 from another contactor being connected to the other tap finger. Contactor 71 is connected serially with contactor 70, and shunted by transition impedance 77. Similarly, contactor 73 is serially connected with contactor 72 and shunted by transition impedance 78.

The switch of Fig. 4 is arranged, as in the case of the switch of the previously cited Jansen patent, so that in any tap position either contactors 70 and 71, or contactors 72 and 73 are closed, and a rapid motion is provided between the alternate positions of the switch. The switch is also arranged, as in the Jansen structure, so that contactor 71 closes after contactor 70 and opens before contactor 70, and contactor 73 opens before contactor 72 and closes after contactor 73. It is necessary, however, that insulation, represented by the insulation block 79, separate the pairs of contactors 70 and 71, and 72 and 73. In the arrangement of Fig. 4 the movable elements 80 and 81 of contactors 70 and 71 respectively are connected together, and the movable elements 82 and 83 of contactors 72 and 73 respectively are connected together.

In the modification of Fig. 5, however, the movable element 80 of contactor 70 is connected to the fixed element 84 of contactor 71, and the movable element 82 of contactor 72 is connected to the fixed element 85 of contactor 73. With this arrangement, the movable elements 81 and 83 of contactors 71 and 73 respectively may be connected directly together.

It will be obvious from the foregoing disclosure that the switching arrangement of my invention may also be applied to other types of switching structures without departing from the spirit and scope thereof. It will be also understood, that, while the forms of the invention herein shown and described constitute preferred embodiments of the invention, it is not intended herein to illustrate all of the possible equivalent forms or ramifications thereof. It will be further understood that the words used are words of description rather than of limitation, and that various changes may be made without departing from the spirit or scope of the invention herein disclosed, and it is aimed in the appended claim to cover all such changes as fall within the true spirit and scope of the invention.

What I claim as new and desire to secure by Letters Patent of the United States is:

Load tap changing means for electric induction apparatus comprising a winding having two groups of a plurality of alternated disposed taps, an electric circuit, and means for sequentially connecting said circuit to said taps comprising a first contact finger arranged to sequentially contact the taps of one of said groups of taps, a second contact finger arranged to sequentially contact the other said group of taps, first and second contacts serially connected between said first finger and said circuit, third and fourth contacts serially connected between said second finger and said circuit, said second and fourth contacts being connected to said circuit, first and second transition impedance means connected in shunt with said second and fourth contacts respectively, said first and second contacts being closed and said third and fourth contacts being open during operation of said apparatus at a predetermined tap position, and means operative during a transitional tap changing period to sequentially open said second contact, close said third contact, open said first contact, and close said fourth contact.

References Cited in the file of this patent

UNITED STATES PATENTS

| | | |
|---|---|---|
| 1,084,469 | Nehlsen | Jan. 13, 1914 |
| 1,764,414 | Puller | June 17, 1930 |
| 2,374,974 | Blume | May 1, 1945 |
| 2,435,438 | Fowler | Feb. 3, 1948 |
| 2,693,573 | Perkins | Nov. 2, 1954 |